3,440,229
PROCESS FOR MAKING CHLOROSTYRENE COPOLYMERS
Chester E. Pawloski, Bay City, and Eugene R. Moore, Midland, Mich., assignors to The Dow Chemical Company, Midland, Mich., a corporation of Delaware
No Drawing. Filed Apr. 5, 1965, Ser. No. 445,755
Int. Cl. C08f *19/02, 1/84*
U.S. Cl. 260—78.5
5 Claims

ABSTRACT OF THE DISCLOSURE

Useful copolymers of ar-chlorostyrene and an unsaturated dicarboxylic acid anhydride such as maleic anhydride are produced by dissolving the anhydride in the mixture obtained by dehydrogenating ethylchlorobenzene and subjecting the solution to vinyl polymerizing conditions.

---

The present invention concerns an improved method for making copolymers of an α,β-unsaturated dicarboxylic acid anhydride and ar-chlorostyrene. It relates particularly to a process whereby essentially homogeneous copolymers containing about 5–50 mole percent of combined anhydried are obtained.

The difficulty involved in preparing the individual isomers of ar-chlorostyrene in quantity as pure compounds has been at least an apparent obstacle to the production of useful polymers of these compounds. The most practical method for making ar-chlorostyrene in more than laboratory quantities is the dehydrogenation of ethylchlorobenzene, either by thermal cracking or, preferably, by catalytic vapor phase dehydrogenation using any of various known ethylbenzene dehydrogenation catalysts. Because the ring monochlorination of ethylbenzene yields a mixture of about equal proportions of the ortho and para isomers, together with a small amount of the meta isomer, all of which products have similar boiling points, it is ordinarily not practical to isolate a particular isomer and the isomeric mixture is usually dehydrogenated as such. The direct separation of a pure ar-chlorostyrene from such a dehydrogenated mixture by fractional distillation is impractical because of the close boiling points of the principal components. The easily initiated and rapid polymerization of ar-chlorostyrene is also a problem, for these chlorostyrenes homopolymerize at several times the rate of styrene itself.

It is known that a homopolymer can be made by the catalytically or thermally initiated polymerization of ar-chlorostyrenes present in a crude dehydrogenated mixture which consists essentially of ar-cholorstyrenes and ethylchlorobenzene. However, the homopolymer thereby obtained contains dimers, trimers, and other low molecular weight material and is generally of poor quality as a resin. It has been used as a means of separating ar-chlorostyrene from ethylchlorobenzene in a process wherein the homopolymer is formed, separated, and then pyrolytically decomposed to give a somewhat reduced yield of the monomer.

Useful copolymers of styrene and an α,β-unsaturated acid anhydride such as maleic anhydride are known, but when impure styrene is used in their preparation, sluggish reaction rates and low quality, nonhomogeneuos polymers are the results. Such copolymers are usually made using purified styrene and particular, stepwise polymerization methods with careful, incremental addition of the anhydride during the course of the process and close temperature control. When styrene is present in excess or the polymerization temperature is not carefully controlled, opaque polymers are produced which consist of styrene anhydried copolymer mixed with polystyrene.

It is, therefore, surprising that a copolymer of ar-chlorostyrene and an α,β-unsaturated dicarboxylic acid anhydride having valuable properties is easily obtained by using a crude dehydrogenation product consisting essentially of ar-chlorostyrene and ar-chloroethylbenzene as the source of the chlorostyrene. It is also unexpected that a substantially homogeneous copolymer is thereby obtained by merely charging all of the anhydride component initially to the polymerization mixture.

Acid anhydrides such as maleic anhydride, chloromaleic anhydride, itaconic anhydride, citraconic anhydride, and aconitic anhydride are equivalent in the process. Maleic anhydride is usually preferred.

This process is particularly applicable to the preparation of such copolymers wherein the ar-chlorostyrene employed is a mixture of two or more isomers such as the mixture obtained by ring-chlorinating ethylbenzene and dehydrogenating the resulting product. Such a dehydrogenated product normally consists of o-chlorostyrene and p-chlorostyrene in about equal proportions with a relatively small amount of the meta isomer, all of which is dissolved in the unreacted ar-chloroethylbenzene of about the same isomer distribution, together with minor quantities of byproducts such as styrene, ethylbenzene, dichlorostyrene, and the like. The chlorostyrenes ordinarily make up about 10–0 mole percent of this mixture, for the dehydrogenation is not carried beyond the 70 percent conversion level without serious loss to side reactions and decomposition. Mixtures containing 30–60 mole percent of chlorostyrenes are preferred. The mixture may be flash distilled to remove low boilers and tar before the anhydried is added and copolymerization is effected. Copolymers of more desirable color are thereby obtained, but the preliminary distillation is otherwise not essential.

Preferably, about 0.05–1 mole of α,β-unsaturated acid anhydride per mole of chlorostyrene is dissolved in the crude dehydrogenation product. The polymer produced then contains chemically combined anhydride and ar-chlorostyrene in about the same ratio, i.e., it consists substantially of about 5–50 mole percent of anhydride and 95–50 percent of chlorostyrene. There are only trace amounts, if any, of the homopolymer of chlorostyrene present in the polymerized product.

The polymerization is preferably thermally initiated by heating the solution to 100–230° C. Under these conditions, polymerization is substantially completed in 1–20 hours. The polymerization can also be initiated by other known means, for example, by the presence of catalytic quantities of conventional peroxide or azo catalysts or by exposure of the solution to ultraviolet light or to high energy ionizing radiaton. Temperatures as low as about 25° C. can then be used.

The polymeric product can be recovered by any known means such as the addition of methanol or other non-solvent to precipitate the polymer. In an effective method of recovery, he volatile portion of the polymerization product which is largely ethyl-chlorobenzene is simply distilled and recycled to the dehydrogenation process, leaying the polymer product as the distillation residue.

The copolymers obtained from this process are hard, essentially clear or translucent moldable solids having heat distortion temperatures of about 120–160° C. and of average molecular weights of about 25,000–100,000. The reactive anhydride groups present in their structure can be further reacted with polyfunctional substances having active hydroxy, epoxy, or amino substituents to make derivative polymers or crosslinked structures.

EXAMPLE 1

Ethylbenzene was reacted at 20–25° C. with about an equimolar amount of chlorine in the presence of a catalytic quantity of iron. The product was distilled under reduced pressure to obtain ethylchlorobenzene which was essentially an equimolar mixture of o-chloroethylbenzene and p-chloroethylbenzene containing about 1 percent m-chloroethylbenzene.

This mixture was passed in the vapor phase over an alumina cracking catalyst at 600–700° C. in the presence of three molar equivalents of steam as a diluent. About 40 percent of the ethylcolorobenzene was converted to ar-chlorostyrene. The cracked product was flash distilled under reduced pressure in the presence of a polymerization inhibitor to remove lights and a small amount of tar, thereby obtaining a mixture containing about 56 mole percent of ar-chlorostyrene which was a mixture of the ortho, meta, and para isomers in about the same relative proportions as in the original ethylchlorobenzene feed.

A mixture of 2700 g. of this crude chlorostyrene solution and 90 g. of maleic anhydride was stirred in a reactor flask at room temperature until the anhydride had completely dissolved. The solution was then heated rapidly to reflux temperature (183° C.) and it was maintained at reflux for six (6) hours when polymerization was essentially complete, the reaction mixture then containing 64.1 percent by weight of solids. The volatile portion which was largely ethylchlorobenzene was distilled from the mixture leaving as the distillation residue a polymeric solid which was substantially a copolymer of maleic anhydride with mixed ar-chlorostyrenes. This polymer had a molecular weight of about 30,000 and contained 12.6 mole percent combined maleic anhydride.

This and similar copolymers are particularly useful in making thermoset laminates, coatings, and moldings. These derivative polymers can be made by combining such a copolymer with 5–10 percent by weight of an organic polyfunctional crosslinking agent such as a polyol a polyepoxide, or a polyamine and heat curing the mixture at 150–250° C. to obtain a hard, durable, crosslinked product. Ethylene glycol, glycerol, 1,4-butanediol, tetraethylene glycol, diglycidyl ether of Bis phenol A, diethylenetriamine, and methylenediamiline are representative polyfunctional crosslinkers.

EXAMPLE 2

Another polymer was made using a solution of 302 g. of maleic anhydride in 4750 g. of a similar cracked and flash-distilled ethylchlorobenzene crude containing about 57.5 percent of ar-chlorostyrenes. The solution was heated at reflux temperature for 3 hours and the polymeric product was recovered by stripping off the ethylchlorobenzene and other volatiles. The product was essentially a copolymer of maleic anhydride and mixed ar-chlorostyrenes of about 35,000 average molecular weight and containing about 15.2 mole percent combined maleic anhydride. Analysis of the stripped volatile portion showed 85.7 mole percent ethylchlorobenzene, 11.6 percent ar-chlorostyrene, 2.7 percent ethyldichlorobenzene, and a trace of maleic anhydride. The copolymer had a Vicat heat distortion temperature of 129.8° C. It was essentially clear and transparent.

EXAMPLE 3

The procedure of Example 2 is repeated using as the chlorostyrene reactant a cracked ethylchlorobenzene fraction containing about 50 mole percent of ar-chlorostyrene without preliminary flash distillation. The ar-chlorostyrene-maleic anhydride copolymer thereby obtained is similar to that described in Examples 1 and 2 except for being slightly yellowish in color. Similar results are obtained when the procedures of the above examples are repeated using another $\alpha,\beta$-unsaturated dicarboxylic acid anhydride as previously described in place of maleic anhydride.

We claim:
1. A process for making a copolymer consisting essentially of about 50–95 mole percent of ar-chloro-styrene chemically combined with about 50–5 mole percent of an $\alpha,\beta$-unsaturated dicarboxylic acid anhydride which comprises the steps:
   (1) dehydrogenating ethylchlorobenzene, thereby producing a mixture consisting essentially of 10–70 mole percent of ar-chlorostyrene dissolved in ethylchlorobenzene,
   (2) forming a solution in said mixture of 0.05–1 mole of said anhydride per mole of ar-chlorostyrene, adding all of said anhydride initially to the mixture, thereafter
   (3) subjecting said solution to vinyl polymerizing conditions, and
   (4) recovering an anhydride-ar-chlorostyrene copolymer from the polymerized solution.

2. The process of claim 1 wherein the unsaturated dicarboxylic acid anhydride is maleic anhydride.

3. The process of claim 2 wherein the vinyl polymerizing conditions consist of heating the maleic anhydride-chlorostyrene solution at 100–230° C.

4. The process of claim 2 wherein the dehydrogenated mixture is distilled to remove low-boilers and tar before the addition of maleic anhydride.

5. The process of claim 2 wherein the ethylchlorobenzene which is dehydrogenated consists essentially of a mixture in about equal proportions of o-ethylchlorobenzene and p-ethylchlorobenzene.

References Cited

UNITED STATES PATENTS

| | | |
|---|---|---|
| 2,769,804 | 11/1956 | Hanson. |
| 2,971,939 | 2/1961 | Baer. |
| 3,085,994 | 4/1963 | Muskat. |

FOREIGN PATENTS

| | | |
|---|---|---|
| 609,597 | 11/1960 | Canada. |

JOSEPH L. SCHOFER, *Primary Examiner.*

JOHN KIGHT, *Assistant Examiner.*